(12) United States Patent
Kager et al.

(10) Patent No.: US 8,337,992 B2
(45) Date of Patent: Dec. 25, 2012

(54) MULTI-LAYER COMPOSITE BODY

(75) Inventors: Gerhard Kager, Piesendorf (AT);
Johann Kappacher, Piesendorf (AT);
Thomas Peis, Zell am See (AT)

(73) Assignee: Senoplast Klepsch & Co. GmbH, Piesendorf (AT)

( * ) Notice: Subject to any disclaimer, the term of this patent is extended or adjusted under 35 U.S.C. 154(b) by 0 days.

(21) Appl. No.: 11/412,896

(22) Filed: Apr. 28, 2006

(65) Prior Publication Data

US 2006/0269723 A1 Nov. 30, 2006

Related U.S. Application Data

(63) Continuation of application No. PCT/AT2004/000339, filed on Oct. 5, 2004.

(30) Foreign Application Priority Data

Oct. 31, 2003 (AT) .................. A 1729/2003

(51) Int. Cl.
*B32B 27/08* (2006.01)
*B32B 27/30* (2006.01)
*B41M 5/00* (2006.01)

(52) U.S. Cl. ............... 428/520; 428/195.1; 428/522

(58) Field of Classification Search ............. 428/195.1, 428/520, 522
See application file for complete search history.

(56) References Cited

U.S. PATENT DOCUMENTS

| | | | |
|---|---|---|---|
| 3,473,996 A | | 10/1969 | Whalen, Jr. |
| 4,228,267 A | * | 10/1980 | Higashizume et al. ........ 523/135 |
| 4,293,603 A | | 10/1981 | Hayman-Chaffey et al. |
| 4,702,942 A | * | 10/1987 | Wood .......................... 428/195.1 |
| 5,017,417 A | * | 5/1991 | Miyazawa et al. .......... 428/195.1 |
| 5,019,448 A | | 5/1991 | Kleosch et al. |
| 5,061,558 A | | 10/1991 | Fischer et al. |
| 5,063,112 A | * | 11/1991 | Gross et al. ................... 428/412 |
| 5,614,289 A | * | 3/1997 | Kobayashi et al. ......... 428/195.1 |
| 6,475,420 B1 | | 11/2002 | Numrich et al. |
| 6,939,627 B2 | * | 9/2005 | Morizumi et al. ............ 428/41.1 |
| 7,001,659 B2 | * | 2/2006 | Iriyama ..................... 428/195.1 |

FOREIGN PATENT DOCUMENTS

| | | | |
|---|---|---|---|
| CN | 1157592 | | 8/1997 |
| DE | 3525634 | * | 1/1987 |
| DE | 87 11 074 | | 12/1987 |
| DE | 87 06 128 | | 10/1988 |
| DE | 38 17 479 | | 11/1989 |
| DE | 40 32 139 | * | 4/1992 |
| DE | 199 54 970 | | 6/2001 |
| EP | 0 283 861 | | 10/1992 |
| EP | 0 304 679 | | 11/1992 |
| EP | 0 576 169 | | 12/1993 |
| EP | 0 699 704 | | 3/1996 |
| EP | 0 781201 | | 2/1998 |
| FR | 2 584 021 | * | 1/1987 |
| JP | 2000-289152 | * | 10/2000 |
| WO | 03/022945 | | 3/2003 |

OTHER PUBLICATIONS

Working With Acrylite® Acrylic Sheet, Cryo Industries, 2004.*
Norilit® 100 NX, Screen and Pad Printing Ink, Technical Information, Pröll, D-91773 Weissenburg i. Bay, Germany, pp. 1-2, Aug. 2002. (Retrieved from: http://cgi.proell.de/cgi-bin/html-e/index.php?menu=0,7&catId=2).
Marabu, Customer Infomration, In-Mold Decoration (IMD), pp. 1-7, Feb. 1998. (Retrieved from: http://www.marabu-inks.com/download/e_ti_98gbinf2.pdf).
Li Hongjin et al., "Extinction Technique for Polyester Paint", Chemical Industry Times, No. 9, pp. 37-39, 2000. (English language Abstract attached).
"Coating Technology", Edited by the Coating Technology Editor Committee, pp. 61, 667-672, 770-775 and 843-847, Chemical Industry Publishing House, Dec. 1997. (English language Abstract attached).

* cited by examiner

*Primary Examiner* — Sheeba Ahmed
(74) *Attorney, Agent, or Firm* — Shook, Hardy & Bacon LLP

(57) ABSTRACT

A multi-layer composite body having at least a single-layer carrier layer and a PMMA layer which is carried thereby and which as its main component has standard PMMA, impact-resistant modified PMMA or mixtures thereof, wherein at least a single-layer lacquer layer is printed on the PMMA layer, and wherein the lacquer layer is printed on the surface of the PMMA layer which is remote from the carrier layer.

37 Claims, 2 Drawing Sheets

US 8,337,992 B2

MULTI-LAYER COMPOSITE BODY

CROSS-REFERENCE TO RELATED APPLICATIONS

This application is a Continuation application of International application No. PCT/AT2004/000339, filed Oct. 5, 2004.

STATEMENT REGARDING FEDERALLY SPONSORED RESEARCH OR DEVELOPMENT (Not Applicable)

NAMES OF PARTIES TO A JOINT RESEARCH AGREEMENT (Not Applicable)

BACKGROUND OF THE INVENTION

1. Field of the Invention

The invention concerns a multi-layer composite body, in particular a multi-layer film, comprising at least a single-layer carrier layer and a PMMA layer which is carried thereby and which as its main component has standard PMMA, impact-resistant modified PMMA or mixtures thereof, wherein at least a single-layer lacquer layer is printed on the PMMA layer.

2. Description of Related Art

Multi-layer composite bodies are already known, for example, for the production of inserts in the sanitary sector by deep drawing (for example, EP 781 201).

BRIEF SUMMARY OF THE INVENTION

The object of the invention is to provide a multi-layer composite body and a process for the production thereof, which while involving relatively simple production allows a flexible surface configuration.

According to the invention the lacquer layer is printed on the surface of the PMMA layer, which is remote from the carrier layer. In order to achieve different decorations, that lacquer layer can initially be applied over the full surface area and region-wise removal can be effected depending on the respectively desired pattern. That removal operation can be effected either by mechanical engraving or however by means of laser engraving.

It is however also possible, preferably in a screen printing process, for the definitively desired pattern to be printed only in region-wise manner on the PMMA layer right from the outset.

Particularly novel surface configurations can be achieved by the lacquer layer being of a matt-finished nature while the PMMA layer disposed therebetween has a shiny surface. In terms of optical impression that gives a contrast which can be still further increased by colouring of the lacquer layer by means of colour pigments and/or of the PMMA layer.

Further advantages and details of the invention are described more fully with reference to the specific description hereinafter.

DETAILED DESCRIPTION OF THE INVENTION

Figure 1:
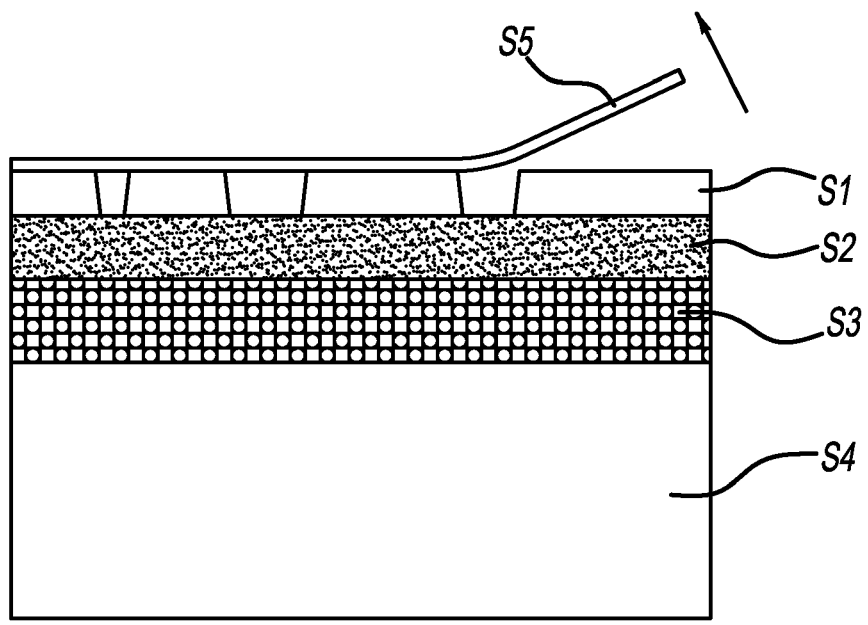
FIG. 1 shows a diagrammatic cross-section through a part of an embodiment by way of example of a multi-layer composite body according to the invention.

The composite body shown in FIG. 1 has a two-layer carrier layer, the two layers being identified by S3 and S4. Those two layers S3 and S4 comprise, for example, ABS or styrene copolymers, preferably SAN, ASA or PS. They can also comprise polycarbonate. Desirably layers S3 and S4 are coextruded jointly with the layer S2 described hereinafter. The coloration of the layer S4 is less critical as it is covered by a pure-colour layer S3, covering with inorganic and/or organic pigments. In that way it is also possible to use inexpensive recycled plastic material for the layer S4.

Disposed on the layer S3 is a PMMA layer comprising standard PMMA, impact-resistant modified PMMA or mixtures thereof. Those materials are the main component of the PMMA layer, that is to say at least 80% by weight comprises standard PMMA, impact-resistant modified PMMA or mixtures thereof. In addition, layer S2 may also contain UV-stabilisers or UV-absorbers. In particular layer S2 can preferably also be provided in a covering relationship with inorganic or organic colour pigments. It is however certainly also possible for the PMMA layer to be of a substantially highly transparent nature. Preferably in any event it has a shiny surface.

Now, in accordance with the invention, an additional lacquer layer S1 is applied by printing to that PMMA layer S2, wherein on the finished end product (such as for example FIG. 1), a layer at a greater depth, preferably the layer S2 with its shiny surface, is visible to the viewer (viewed here from above), between the regions of the lacquer layer S1.

A protective film S5 which can be pulled off and which is applied to the uppermost lacquer layer S1 of the composite body can preferably be laminated thereon and after transport can be pulled off prior to actual use, as is indicated by the arrow in FIG. 1.

It is preferably provided that otherwise the uppermost lacquer layer S1 is not covered by a further cover layer. In principle, however, it is also possible for a clear lacquer layer to be also applied by printing thereover, preferably over the full surface area involved.

The lacquer for the lacquer layer S1 can be a solvent-bearing lacquer, in which respect preferably organic solvents such as, for example, esthers or ketones can be used as the solvent. It is, however, also possible to use other lacquer layers depending on the respective situation of use. They include UV-hardening lacquers but in particular also lacquer layers in which a water-dilutable lacquer, preferably acrylate-based, is used.

In accordance with a preferred embodiment of the invention the lacquer layer is of a matt-finished nature, desirably containing a matting agent. That matting agent can comprise, for example, matting particles which can be of organic or inorganic origin. By way of example a matting agent based on silicic acid and to a slight extent of tallow is suitable. The size of those matting agents is preferably larger than the thickness of the lacquer layer S1 and is preferably between 20 µm and 60 µm. The lacquer layer itself is preferably of a thickness of 1 µm to 50 µm, particularly preferably from 2 µm to 20 µm.

Alternatively it is also possible for the lacquer layer to be chemically matted by the addition of constituents which, upon hardening of the lacquer, result in shrinkage processes in the lacquer matrix.

Furthermore the lacquer layer S1 can be coloured with inorganic and/or organic pigments which either result in an opaque colour layer leave the lacquer layer still transparently coloured so that the layer S2 disposed therebeneath still shimmers through. In any event a novel optical effect can be achieved with the matting of the lacquer layer S1 of the shiny surface of the subjacent PMMA layer S2, optionally by additional high-contrast coloration which however is not necessary.

As regards the thicknesses of the layers it is preferable if the overall composite body is of a thickness of between 0.3 mm and 5.0 mm, particularly preferably between 0.4 mm and 1.5 mm. In that respect the layers S3, S4 make up the large part of the thickness. The layer S3 can preferably be between 50 µm and 600 µm while the layer S4 is preferably between 500 mm and 2900 mm.

The sizes of the above-specified matting agents (mean size of the cross-sectional dimension) are desirably between 20 µm and 30 µm in the case of fine matting and between 50 µm and 60 µm in the case of coarse matting.

Figure 2:
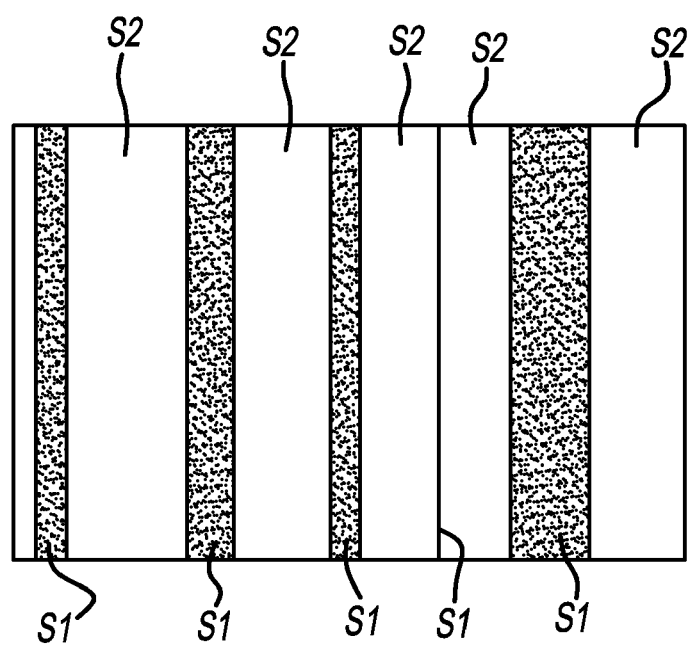
FIG. 2 shows a plan view of another embodiment of a multi-layer composite body.

FIG. 2 shows an example of a surface configuration in the case of a multi-layer composite body, in particular a flexible multi-layer film according to the invention. 'S2' denotes the shiny surface which is visible between the printed, preferably matted, lacquer layer S1. In the present case this involves a stripe pattern. However, other patterns can also be easily implemented using, for example, a screen printing process.

Figure 3:
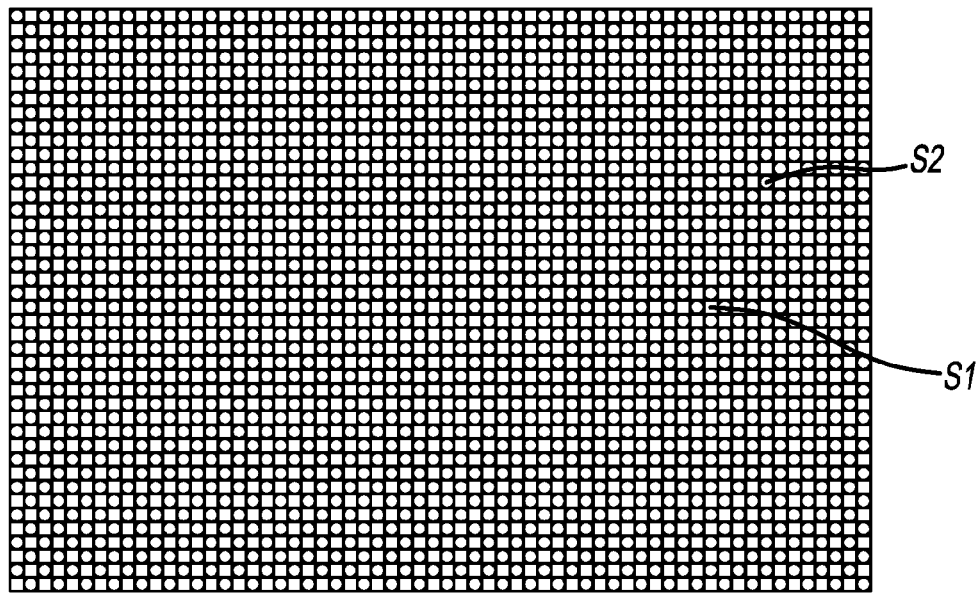
FIG. 3 shows a plan view of a further embodiment of a multi-layer composite body.

In the embodiment illustrated in FIG. 3 a pattern with extensive circles is applied by printing in the form of a lacquer layer S1 to the PMMA layer S2.

The invention relates not only to a multi-layer composite body but also to a process for the production thereof. According to the invention that process is characterised in that a PMMA layer disposed on a carrier is printed upon with lacquer, forming a lacquer layer.

In that respect it is possible for the lacquer layer firstly to be applied by printing to the PMMA layer substantially over the full area involved and then removed region-wise so that in the removed regions a subjacent layer, preferably the PMMA layer, is exposed. Removal of the lacquer layer can be effected by mechanical engraving or by using lasers (laser engraving). In particular $CO_2$ lasers and YAG lasers are suitable as the lasers, wherein the $CO_2$ lasers operate with a wavelength of 20.6 µm and typically involve energies of 10 W to 200 W. The YAG lasers typically operate at 1.064 µm and have an energy of 5 W to 15 W.

It is however possible for the definitive surface pattern of the composite body to be established in the printing step by the PMMA layer being printed upon only in a region-wise manner.

In particular the screen printing process is suitable for that purpose. However, other processes such as, for example, intaglio printing, alternate printing and cylinder printing processes, tampon processes or casting processes are certainly conceivable and possible.

As regards production of the layers S3 and S4, these can be coextruded jointly with the PMMA layer (S2).

The multi-layer composite body according to the invention, in particular in the form of a flexible film, can be used as a decorative cover layer, in particular for furniture. Also the multi-layer composite body according to the invention can be used for the production of three-dimensional objects, in particular by thermal shaping and/or deep drawing.

Figure 4:
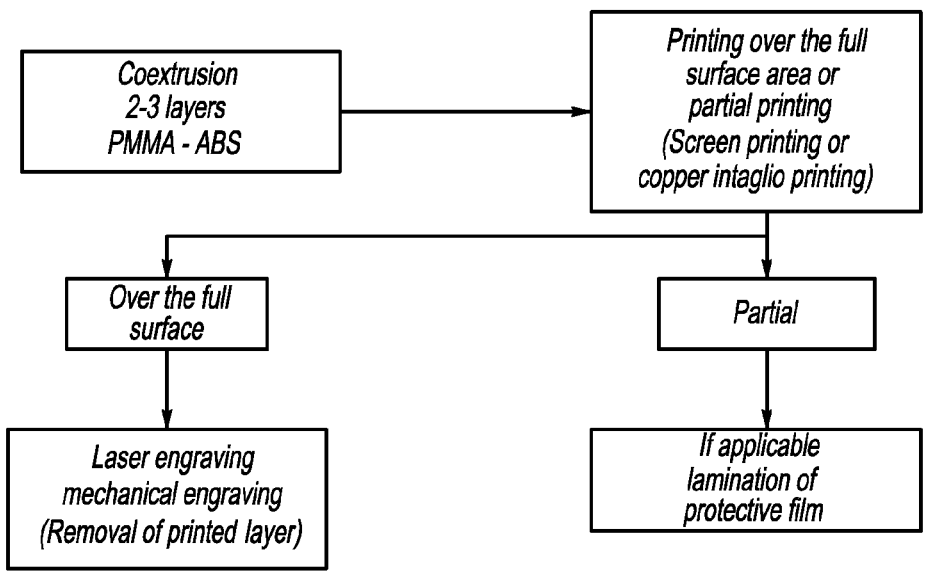
FIG. 4 shows possible process combinations for the production of a multi-layer composite body according to the invention in a block flow chart.

FIG. 4 shows an overview of possible process variants.

It will be appreciated that the invention is not limited to the illustrated embodiments. For example, the lacquer of the lacquer layer S1 can also be of a highly shiny nature. It can also be arranged over the full surface area over the layer S2. The layer S2 can admittedly and preferably be coextruded with the layers S3 and S4. It is however also possible for that layer S2 to be subsequently applied by lamination or printing.

The invention claimed is:

1. A multi-layer, thermoformable coextrudate having a visible surface, the coextrudate comprising:
   a carrier layer comprising a material selected from the group consisting of acrylonitrile butadiene styrene, styrene copolymers and polycarbonate;
   a poly(methyl methacrylate) layer composed of at least 80% by weight poly(methyl methacrylate) formed over said carrier layer, said poly(methyl methacrylate) layer having a surface; and
   a lacquer layer printed on said surface of said poly(methyl methacrylate) layer, said lacquer layer defining at least a portion of the visible surface of the multi-layer, thermoformable coextrudate.

2. The multi-layer coextrudate of claim 1 wherein said copolymers comprise styrene acrylonitrile, acrylonitrile styrene acrylate, and polystyrene.

3. The multi-layer coextrudate of claim 1 wherein said carrier layer and said poly(methyl methacrylate) layer are co-extruded components.

4. The multi-layer coextrudate of claim 1 further including a coloring agent.

5. The multi-layer coextrudate of claim 4 wherein said coloring agent is selected from the group consisting of inorganic and organic pigments.

6. The multi-layer coextrudate of claim 1 wherein said poly(methyl methacrylate) layer is selected from the group consisting of non-impact-resistant poly(methyl methacrylate), impact-resistant modified poly(methyl methacrylate) and mixtures thereof.

7. The multi-layer coextrudate of claim 1 wherein said poly(methyl methacrylate) layer contains UV-stabilizers.

8. The multi-layer coextrudate of claim 1 wherein said poly(methyl methacrylate) layer contains UV-absorbers.

9. The multi-layer coextrudate of claim 1 wherein said poly(methyl methacrylate) layer includes a coloring agent.

10. The multi-layer coextrudate of claim 9 wherein said coloring agent is selected from the group consisting of inorganic and organic pigments.

11. The multi-layer coextrudate of claim 1 further including a removable protective film on said lacquer layer.

12. The multi-layer coextrudate of claim 1 wherein said lacquer layer includes a lacquer solvent, said lacquer solvent being an organic solvent selected from the group consisting of esters or ketones.

13. The multi-layer coextrudate of claim 1 wherein said lacquer layer includes a UV-hardening lacquer.

14. The multi-layer coextrudate of claim 1 wherein said lacquer layer comprises a water-soluble lacquer, based on polyurethane, epoxy resin or acrylate.

15. The multi-layer coextrudate of claim 1 wherein said lacquer layer is of a thickness of between 1 µm to 50 µm and 2 µm to 20 µm.

16. The multi-layer coextrudate of claim 1 wherein said lacquer layer partially covers said poly(methyl methacrylate) layer.

17. The multi-layer coextrudate of claim 1 wherein said lacquer layer has an outer surface, said outer surface being matted.

18. The multi-layer coextrudate of claim 17, wherein the size of matting particles in the outer surface is between 20 μm and 60 μm.

19. The multi-layer coextrudate of claim 18, wherein said matting particles include silicic acid.

20. The multi-layer coextrudate of claim 19 wherein said matting particles include tallow.

21. The multi-layer coextrudate of claim 1 wherein said lacquer layer includes a coloring agent.

22. The multi-layer coextrudate of claim 1 wherein said lacquer layer is opaque.

23. The multi-layer coextrudate of claim 1 wherein said lacquer layer is transparent.

24. The multi-layer coextrudate of claim 1 wherein said poly(methyl methacrylate) layer includes a matting agent.

25. The multi-layer coextrudate of claim 24 wherein said matting agent is selected from the group consisting of organic matting agent and inorganic matting agent.

26. The multi-layer coextrudate of claim 1 wherein said poly(methyl methacrylate) layer has a thickness of between 20 μm and 600 μm.

27. The multi-layer coextrudate of claim 1 wherein said carrier layer is composed of a recycled material.

28. The multi-layer coextrudate of claim 1 wherein the thickness of the coextrudate body is between 0.3 mm and 5.0 mm.

29. The multi-layer coextrudate of claim 1 wherein the thickness of the overall coextrudate body is between 0.4 mm and 1.5 mm.

30. The multi-layer coextrudate of claim 1 wherein the multi-layer coextrudate body is a multi-layer film.

31. A multi-layer coextrudate having a visible surface, the coextrudate comprising:
   a carrier layer comprising a material selected from the group consisting of acrylonitrile butadiene styrene, styrene copolymers and polycarbonate;
   a poly(methyl methacrylate) layer composed of at least 80% by weight poly(methyl methacrylate), said poly(methyl methacrylate) layer being formed over said carrier layer having a surface; and
   a lacquer layer printed onto said surface of said poly(methyl methacrylate) layer, said lacquer layer having different characteristics from said surface of said poly(methyl methacrylate) layer, said different characteristics being selected from the group consisting of color and surface structure, wherein at least a portion of said lacquer layer is removed by engraving, said poly(methyl methacrylate) layer being exposed where said portion of said lacquer layer has been removed.

32. The multi-layer coextrudate of claim 31 wherein the lacquer layer is coloured with pigments selected from the group of inorganic pigmente, organic pigments or combinations thereof.

33. The multi-layer coextrudate of claim 31 wherein the lacquer layer is opaque.

34. The multi-layer coextrudate of claim 31 wherein the lacquer layer is transparent.

35. The multi-layer coextrudate of claim 31 wherein said carrier layer and said poly(methyl methacrylate) layer are co-extruded components.

36. The multi-layer coextrudate of claim 31 further including a removable protective film an said lacquer layer.

37. A multi-layer, thermoformable coextrudate having a visible surface, the coextrudate comprising:
   a carrier layer comprising a material selected from the group consisting of acrylonitrile butadiene styrene, styrene copolymers and polycarbonate;
   a poly(methyl methacrylate) layer composed of at least 80% by weight poly(methyl methacrylate) formed over said carrier layer, said poly(methyl methacrylate) layer having a surface; and
   a lacquer layer printed on said surface of said poly(methyl methacrylate) layer, said lacquer layer defining at least a portion of the visible surface of the multi-layer, thermoformable coextrudate, and said laquer layer including a lacquer solvent, said lacquer solvent being an organic solvent selected from the group consisting of esters or ketones.

* * * * *